UNITED STATES PATENT OFFICE.

WILLIAM CHADWICK, THOMAS CHADWICK, AND JAMES CHADWICK, OF MANCHESTER, AND JOSIAH W. KYNASTON, OF LIVERPOOL, ENGLAND.

PROCESS FOR MAKING AND PURIFYING SULPHATE OF ALUMINA OR ALUM.

SPECIFICATION forming part of Letters Patent No. 230,106, dated July 20, 1880.

Application filed October 29, 1879.

*To all whom it may concern:*

Be it known that we, WILLIAM CHADWICK, THOMAS CHADWICK, and JAMES CHADWICK, all of Manchester, and JOSIAH WICKLIFFE KYNASTON, of Liverpool, both places being in the county of Lancaster, in the Kingdom of England, have invented a new and useful Process for Making and Purifying Sulphate of Alumina or Alum, of which the following is a specification.

The object of our invention is the production of sulphate of alumina neutral and either absolutely free from iron or containing only an extremely small proportion of this element and free from other impurity or admixture.

In carrying out this invention we take bauxite, (or other mineral soluble in sulphuric acid and rich in alumina, but not in iron,) and reduce it to a state of exceedingly fine powder, and mix it intimately with a proportion of arsenious acid (common white arsenic) also finely powdered, varying from three to five per cent. of the weight of the bauxite, according to the proportion of iron contained in the bauxite. We now take sulphuric acid of from 90° to 100° Twaddle, (specific gravity 1.450 to 1.500,) and having first heated it in a leaden pan of large capacity, we add to it the mixture of bauxite and arsenic in sufficient quantity to produce a neutral solution. We continuously agitate the mixture, and to moderate the violence of the reaction we run in from time to time sufficient cold water, but not so as to dilute the mixture unnecessarily. We continue the agitation until the reaction is complete, and then add sufficient hot water to reduce the mixture to about 40° Twaddle, (specific gravity 1.200.) We now add to the mixture finely-powdered chalk or other carbonate of lime in small portions at a time, so long as it continues to produce a brown or brownish-red coloration. This point is determined by taking from time to time a portion of the liquid and filtering or allowing it to deposit, and then adding to the clear or slightly-turbid solution a little more carbonate of lime. When no further deepening of the color of the liquid is produced sufficient carbonate of lime has been added. If the operation has been properly conducted and a neutral or basic solution obtained it will be found that by far the larger proportion of the oxide of iron present will be in an insoluble form in union with arsenic previous to the addition of carbonate of lime, and if the solution is allowed to stand at rest it will fall out of the solution as a brown layer superincumbent on the heavier deposit of undecomposed bauxite. The addition of carbonate of lime in small proportion now determines the separation of nearly the whole of the remaining soluble iron. If the solution obtained is not neutral, but contains more or less free acid, a larger proportion of carbonate of line is required, the first portions added being consumed in neutralizing the free acid; but when a sufficient quantity of carbonate of lime is added the separation of the iron is as complete as when a neutral solution has been obtained in the first instance. After the addition of the necessary quantity of carbonate of lime the mixture is thoroughly agitated, and then transferred to settling-tanks, of lead, where it is allowed to stand for from ten to fourteen days to allow the insoluble matter to deposit. The supernatant liquid is then drawn off, passed through a filter, if not quite clear, and then by any suitable means treated with sulphureted-hydrogen gas until the excess of arsenic is rendered insoluble. It is then allowed to stand for twenty-four hours, or until the sulphide of arsenic has completely deposited, and the clear liquid is run into a leaden pan and boiled down to a degree sufficient to allow of its solidifying when cold. There is thus obtained a sulphate of alumina of a higher degree of purity than we believe has ever yet been obtained, and fit for use extensively in the arts and manufactures.

We find that our process yields almost as satisfactory results if, instead of mixing the bauxite with the arsenic, as before described, arsenic is first dissolved in the sulphuric acid, or the arsenic may be dissolved in the solution obtained by heating bauxite and sulphuric acid alone. In either case the subsequent addition of carbonate of lime determines the separation of iron in the insoluble state.

We find also that the process is equally applicable for the separation of iron from ordinary commercial ferruginous sulphate of alumina, either prepared from bauxite or other aluminous minerals.

To obtain sulphate of alumina practically free from traces of iron we take the clear solution obtained, as before described, by settling after the addition of carbonate of lime, and to this solution (before the removal of the excess of arsenic) we add a solution of ferro-cyanide of calcium exactly in sufficient quantity to precipitate the whole of the iron; but, as we prefer to make this part of the invention the subject-matter for a separate application for a patent, we deem it unnecessary to further describe the same in detail here.

We claim as our invention—

1. The process for making sulphate of alumina or alum-cake commercially pure—namely, treating bauxite or other alumina or hydrate of alumina soluble in sulphuric acid with sulphuric and arsenious acid, neutralizing with carbonate of lime until the iron is precipitated, and then separating the arsenic by sulphureted hydrogen.

2. The mode of separating iron from alum or sulphate of alumina in solution by treating the solution with arsenious acid, neutralizing with carbonate of lime until the iron is precipitated, and then precipitating the remaining arsenic by sulphureted hydrogen.

3. In the manufacture or purification of alumina, alum-cake, or alum, the method of precipitating the iron by means of arsenious acid and carbonate of lime conjointly.

WILLIAM CHADWICK.
    THOMAS CHADWICK.
    JAMES CHADWICK.
    JOSIAH WICKLIFFE KYNASTON.

Witnesses:
 EDWARD NOAR,
 ORLANDO HAIGH HULME.